United States Patent
Hablot et al.

(10) Patent No.: US 11,780,991 B2
(45) Date of Patent: *Oct. 10, 2023

(54) COMPOSITIONS COMPRISING CARBON FIBERS AND AT LEAST ONE THERMOPLASTIC POLYOLEFIN ELASTOMER

(71) Applicant: Dow Global Technologies LLC, Midland, MI (US)

(72) Inventors: Elodie Hablot, Horgen (CH); Russell P. Barry, Schänis (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,128

(22) Filed: Mar. 10, 2022

(65) Prior Publication Data

US 2022/0195146 A1 Jun. 23, 2022

Related U.S. Application Data

(63) Continuation of application No. 16/325,057, filed as application No. PCT/US2017/046229 on Aug. 10, 2017, now abandoned.

(60) Provisional application No. 62/374,140, filed on Aug. 12, 2016.

(51) Int. Cl.
   C08K 9/08    (2006.01)
   C08K 3/04    (2006.01)
   C08K 7/06    (2006.01)

(52) U.S. Cl.
   CPC ............ C08K 9/08 (2013.01); C08K 3/04 (2013.01); C08K 7/06 (2013.01)

(58) Field of Classification Search
   CPC .... C08K 9/08; C08K 3/04; C08K 7/06; C08L 23/16; C08L 23/12; C08F 2500/12; C08F 2500/18
   USPC ........................................................ 523/205
   See application file for complete search history.

(56) References Cited

U.S. PATENT DOCUMENTS

| | | |
|---|---|---|
| 3,251,905 A | 5/1966 | Zelinski et al. |
| 3,265,765 A | 8/1966 | Holden et al. |
| 3,390,207 A | 6/1968 | Moss et al. |
| 3,598,887 A | 8/1971 | Darcy et al. |
| 3,639,521 A | 2/1972 | Hsieh |
| 4,208,356 A | 6/1980 | Fukawa et al. |
| 4,219,627 A | 8/1980 | Halasa et al. |
| 4,789,699 A | 12/1988 | Kieffer et al. |
| 5,093,422 A | 3/1992 | Himes |
| 5,272,236 A | 12/1993 | Lai et al. |
| 5,278,272 A | 1/1994 | Lai et al. |
| 5,332,613 A | 7/1994 | Taylor et al. |
| 5,504,172 A | 4/1996 | Imuta et al. |
| 5,986,028 A | 11/1999 | Lai et al. |
| 6,582,829 B1 | 6/2003 | Quinn et al. |
| 7,855,258 B2 | 12/2010 | Datta et al. |
| 8,034,440 B2 | 10/2011 | Morman et al. |
| 8,420,760 B2 | 4/2013 | Hughes et al. |
| 8,530,565 B2 | 9/2013 | Honma et al. |
| 8,536,268 B2 | 9/2013 | Karjala et al. |
| 8,618,214 B2 | 12/2013 | Tsou et al. |
| 8,716,387 B2 | 5/2014 | Posch |
| 9,382,410 B2 | 7/2016 | Bernreitner et al. |
| 9,657,165 B2 | 5/2017 | Maruyama |
| 9,879,123 B2 | 1/2018 | Sano et al. |
| 10,435,549 B2 | 10/2019 | Prieto |
| 2004/0087235 A1 | 5/2004 | Morman et al. |
| 2004/0122408 A1 | 6/2004 | Potnis et al. |
| 2004/0122409 A1 | 6/2004 | Thomas et al. |
| 2006/0211819 A1 | 9/2006 | Hoenig et al. |
| 2007/0203273 A1 | 8/2007 | Van Riel et al. |
| 2009/0105404 A1 | 4/2009 | van Riel et al. |
| 2011/0263778 A1 | 10/2011 | Honma et al. |
| 2014/0163154 A1 | 6/2014 | Shipley et al. |
| 2014/0242335 A1* | 8/2014 | Kondo ..................... C08L 23/10 524/576 |
| 2014/0356612 A1 | 12/2014 | Sano et al. |
| 2015/0087786 A1* | 3/2015 | Maruyama .............. C08L 23/12 525/240 |
| 2015/0315371 A1 | 11/2015 | Okunaka et al. |
| 2019/0169411 A1 | 6/2019 | Hablot et al. |
| 2022/0195164 A1* | 6/2022 | Hablot ..................... C08K 7/06 |

FOREIGN PATENT DOCUMENTS

| | | |
|---|---|---|
| CN | 103131166 | 6/2013 |
| CN | 102952309 | 11/2014 |
| CN | 104151708 | 11/2014 |

(Continued)

OTHER PUBLICATIONS

Rogers, S.; Walia, P.; Van Riel, Norwin; Van Dun, Jozef; Traugott, Tom, Breakthrough material for low gloss and abrasion resistance with molded-in-color automotive interior components (2008) ANTEC (Plastics Fabrication and Uses (section 38-3)).

Nogueira C.L., Faulstich de Paiva J.M., Cerqueira Rezende M., Effect of the interfacial adhesion on the tensile and impact properties of carbon fiber reinforced polypropylene matrices, Materials research, 2005;8(1):81-89.

PCT/US2017/046229, International Search Report and Written Opinion dated Mar. 11, 2017.

PCT/US2017/046229, International Preliminary Report on Patentability dated Feb. 12, 2019.

*Primary Examiner* — Hannah J Pak

(57) ABSTRACT

The present disclosure relates to a composition comprising: (A) from 40 wt % to 95 wt % of a thermoplastic polyolefin elastomer and (B) from 5 wt % to 60 wt % of a carbon fiber component. In certain embodiments, the composition of the present disclosure reaches a high level of stiffness while exhibiting a high level of toughness. Moreover, a decrease in gloss appearance and an improvement in resistance to abrasion are expected.

3 Claims, No Drawings

(56) References Cited

FOREIGN PATENT DOCUMENTS

| CN | 104562299 | 4/2015 |
|---|---|---|
| CN | 104822736 | 10/2017 |
| EP | 0712892 | 5/1996 |
| EP | 2927265 | 10/2015 |
| JP | 2001106835 | 4/2001 |
| JP | 2006124454 | 5/2006 |
| JP | 2009149823 | 7/2009 |

* cited by examiner

COMPOSITIONS COMPRISING CARBON FIBERS AND AT LEAST ONE THERMOPLASTIC POLYOLEFIN ELASTOMER

CROSS REFERENCE TO RELATED APPLICATIONS

This Application is a continuation of U.S. application Ser. No. 16/325,057 filed on Feb. 12, 2019, which is a § 371 of International Application No. PCT/US2017/046229 filed on Aug. 10, 2017, which claims priority to U.S. Provisional Application No. 62/374,140 filed on Aug. 12, 2016.

FIELD

Embodiments relate to compositions that include carbon fibers and at least one thermoplastic polyolefin elastomer.

INTRODUCTION

One of the key challenges in the automotive industry is the desire to reduce the weight of a vehicle in order to decrease fuel consumption. Decreased fuel consumption would result in reduced pollution and would benefit the environment. Carbon fibers, with their low density (around 1.78 g/cc) and high stiffness, offer an interesting source of substitution to conventional glass fibers (density of around 2.60 g/cc) and high strength steel (density of around 7.80 g/cc) currently used in the automotive industry. However, carbon fibers present impact performance challenges as they are very brittle and break down to small fibers after being compounded or injection molded into parts. Accordingly, a need exists for carbon fiber solutions that provide high stiffness and good impact performance while retaining a high and commercially interesting modulus. In addition, reduced gloss and resistance to abrasion are important criteria in the in the automotive industry, and the carbon fiber solutions disclosed herein would be expected to offer such improvements.

SUMMARY

In certain embodiments, the present disclosure relates to a composition comprising: (A) from 40 wt % to 95 wt % of a thermoplastic polyolefin elastomer and (B) from 5 wt % to 60 wt % of a carbon fiber component.

DETAILED DESCRIPTION

Definitions

The numerical ranges disclosed herein include all values from, and including, the lower value and the upper value. For ranges containing explicit values, any subrange between any two explicit values is included. As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms is a mixture of two or more components. Included in compositions are pre-reaction, reaction and post-reaction mixtures, the latter of which will include reaction products and by-products, as well as unreacted components of the reaction mixture and decomposition products, if any, formed from the one or more components of the pre-reaction or reaction mixture.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. "Interpolymer," as used herein, refers to a polymer having polymerized therein at least two monomers and includes, for example, copolymers, terpolymers and tetrapolymers.

The terms "ethylene/α-olefin polymer" and "propylene/α-olefin polymer" are indicative of copolymer as described above prepared from polymerizing ethylene or propylene, respectively, and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

As used herein, "alpha-olefin" or "α-olefin" refer to olefins or alkenes with the chemical formula $C_xH_{2x}$, distinguished by having a double bond at the primary or alpha (α) position. As used herein, alpha-olefins include, but are not limited to, ethylene, propylene, 1-butene, 1-pentene, 1-hexene, 4-methyl-1-pentene, 1-heptene, 1-octene, 1-nonene, 1-decene, 1-dodecene, and the like.

The terms "ethylene/α-olefin interpolymer" and "ethylene/α-olefin multi-block interpolymer," as used herein, refer to an interpolymer that comprises a polymerized ethylene monomer and at least one α-olefin.

"Blend," "polymer blend," and like terms is a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Units derived from ethylene," "ethylene content," and like terms mean the units of a polymer formed from the polymerization of ethylene monomers. "Units derived from α-olefin," "alpha-olefin content," "α-olefin content," and like terms mean the units of a polymer formed from the polymerization of specific α-olefin monomers. "Units derived from propylene," "propylene content," and like terms mean the units of a polymer formed from the polymerization of propylene monomers.

"Propylene based polymer" and like terms mean a polymer that comprises a majority weight percent of polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α-olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a C3-10 α-olefin) so as to form an ethylene-based interpolymer. For example, when the ethylene-based polymer is a copolymer, the amount of ethylene is greater than 50 wt %, based on the total weight of the copolymer.

The term "polyethylene" includes homopolymers of ethylene and copolymers of ethylene and one or more C3-8 α-olefins in which ethylene comprises at least 50 mole percent. The term "polypropylene" includes homopolymers of propylene, such as isotactic polypropylene, atactic polypropylene, syndiotactic polypropylene, and copolymers of propylene and one or more C2 and C4-8 α-olefins in which propylene comprises at least 50 mole percent.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Thermoplastic Polyolefin Elastomer (TPE)

The composition may include from 40 wt % to 95 wt % (e.g., from 45 wt % to 95 wt %, from 50 wt % to 95 wt %, from 70 wt % to 95 wt %, from 70 wt % to 90 wt %, and/or 75 wt % to 85 wt %) of a thermoplastic polyolefin elastomer (TPE) component. In certain embodiments, the TPE component provides toughness to the composition. In certain embodiments, the TPE component is a polyolefin (PO) that (1) has the properties of an elastomer, i.e., the ability to be stretched beyond its original length and retract to substantially its original length when released, and (2) can be processed like a thermoplastic, i.e., to soften when exposed to heat and return to substantially its original condition when cooled to room temperature.

Nonlimiting examples of suitable TPE's include styrenic block copolymers (e.g., SEBS block copolymers), ethylene/α-olefin (i.e., ethylene-based) interpolymers (e.g., ENGAGE™ and AFFINITY™ plastomers and elastomers), ethylene/α-olefin multi-block interpoylmers (OBCs) (e.g., INFUSE™), propylene-based olefin block copolymers (e.g., INTUNE™), and propylene/α-olefin (i.e., propylene-based) interpolymers (e.g., VERSIFY™ plastomers and elastomers).

In exemplary embodiments of the composition of the present disclosure, the TPE component includes propylene/α-olefin copolymers, such as the VERSIFY™ plastomers and elastomers available from The Dow Chemical Company and the VISTAMAXX™ plastomers and elastomers available from ExxonMobil Chemical Company.

In certain embodiments, the propylene/α-olefin copolymers are characterized as comprising (A) between 60 and less than 100 (e.g., between 80 and 99 and/or between 85 and 99) weight percent units derived from propylene, and (B) between greater than zero and 40 (e.g., between 1 and 20, between 4 and 16, and/or between 4 and 15) weight percent units derived from at least one of ethylene and/or a $C_{4-30}$ α-olefin. Suitable $C_{4-30}$ α-olefins include, but are not limited to, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, and vinylcyclohexane. In certain embodiments, the propylene/α-olefin copolymers are propylene-ethylene copolymers.

Exemplary propylene/α-olefin copolymers include, but are not limited to, those that are disclosed in WO 2009/067337 A1, which is incorporated herein by reference in its entirety. Exemplary propylene/α-olefin copolymers also include, but are not limited to, those that are disclosed in WO 2006/069205 A1, which is incorporated herein by reference in its entirety. The propylene/α-olefin copolymers of the present disclosure are made by processes known by those skilled in the art, including the processes described in WO 2009/067337 A1 and WO 2006/069205 A1. Exemplary propylene/α-olefin copolymers may be formed by means within the skill in the art, for example, by using single site catalysts or Ziegler Natta catalysts.

The propylene/α-olefin copolymers may have a density from 0.850 g/cc to 0.900 g/cc in accordance with ASTM D792 at 230° C./2.16 Kg (e.g., from 0.850 g/cc to 0.895 g/cc, from 0.850 g/cc to 0.890 g/cc, and/or from 0.870 g/cc to 0.890 g/cc). The propylene/α-olefin copolymers may have a melt flow rate in the range of from 0.1 to 500 grams per 10 minutes (g/10 min) measured in accordance with ASTM D-1238 at 230° C./2.16 Kg (e.g., from 0.1 g/10 min to 100 g/10 min, from 0.1 g/10 min to 75 g/10 min, and/or from 0.1 g/10 min to 50 g/10 min). The propylene/α-olefin copolymers may have a shore A hardness from 50 to 150 in accordance with ASTM D2240 (e.g., from 60 to 120 and/or from 70 to 100). The propylene/α-olefin copolymers may have a glass transition temperature (DSC inflection point) from −15° C. to −50° C. The propylene/α-olefin copolymers may have an ultimate tensile strength in accordance with ASTM D638 from 300 psi to 3000 psi (e.g., from 350 psi to 2800 psi and/or from 400 psi to 2500 psi). The propylene/α-olefin copolymers may have a flexural modulus from 1 to 100 kpsi in accordance with ASTM D790 (1% sec) (e.g., from 1 kpsi to 75 kpsi and/or from 1 kpsi to 65 kpsi). The propylene/α-olefin copolymers may have a melting temperature (DSC Tm peak as measured, for example, by the DSC procedure described in U.S. Pat. No. 6,566,446) of 50-130° C. Further parameters of the propylene/α-olefin copolymers (e.g., crystallinity, heat of fusion, molecular weight, viscosity, molecular weight distribution, etc.) may be known or determined by one of ordinary skill in the art.

In certain embodiments, the propylene/α-olefin copolymers are further characterized as containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term "long chain branch," as used herein, refers to a chain length greater than that resulting from the incorporation of the comonomer into the polymer backbone. Furthermore, the term "long chain branch" refers to a chain length of at least one carbon more than a short chain branch, and "short chain branch," as used herein, refers to a chain length of two carbons less than the number of carbons in the comonomer. For example, a propylene/1-octene interpolymer has backbones with long chain branches of at least seven (7) carbons in length, but these backbones also have short chain branches of only six (6) carbons in length.

The propylene/α-olefin copolymers are further characterized as having substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

In certain embodiments, the propylene/α-olefin copolymers have a molecular weight distribution (MWD), defined as weight average molecular weight divided by number average molecular weight ($M_w/M_n$), of 4 or less; of 3.5 or less; of 3.0 or less; or from 1.8 to 3.0.

Other TPE polymers useful in the practice of the compositions of the present disclosure include, for example, but are not limited to, thermoplastic urethane (TPU), ethylene/vinyl acetate (EVA) copolymers (e.g., Elvax 40L-03 (40% VA, 3MI) (DuPont)), ethylene/ethyl acrylate (EEA) copolymers (e.g., AMPLIFY™) and ethylene acrylic acid (EAA) copolymers (e.g., PRIMACOR™) (The Dow Chemical Company), polyvinylchloride (PVC), epoxy resins, styrene acrylonitrile (SAN) rubber, and Noryl® modified PPE resin (amorphous blend of polyphenylene oxide (PPO) and polystyrene (PS) by SABIC), among others. Also useful are olefinic elastomers including, for example, very low density polyethylene (VLDPE) (e.g., FLEXOMER™ ethylene/1-hexene polyethylene, The Dow Chemical Company), homogeneously branched, linear ethylene/α-olefin copolymers (e.g. TAFMER™ by Mitsui Petrochemicals Company Limited and EXACT™ by DEXPlastomers), and homogeneously branched, substantially linear ethylene/α-olefin polymers (e.g., AFFINITY™ ethylene-octene plastomers (e.g., EG8200 (PE)) and ENGAGE™ polyolefin elastomers, The Dow Chemical Company). Substantially linear ethylene copolymers are more fully described in U.S. Pat. Nos. 5,272,236, 5,278,272 and 5,986,028. Additional olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer, FLEXOMER™, HPDE 3364 and HPDE 8007 polymers (The Dow Chemical Company), ESCORENE™ and EXCEED™ polymers (Exxon Mobil Chemical). Nonlimiting examples of suitable TPUs include PELLETHANE™ elastomers (Lubrizol Corp. (e.g., TPU 2103-90A); ESTANE™, TECOFLEX™, CARBOTHANE™, TECOPHILIC™, TECOPLAST™ and TECOTHANE™ (Noveon); ELASTOLLAN™, etc. (BASF), and commercial TPUs available from Bayer, Huntsman, the Lubrizol Corporation and Merquinsa.

In certain embodiments, the TPE component includes from 0 wt % to 40 wt % of a styrenic block copolymer, such as a polystyrene-block-poly(ethylene-co-butylene)-block-polystyrene (SEBS) triblock thermoplastic elastomer. In general, styrenic block copolymers suitable for the invention include at least two mono-alkenyl arene blocks, preferably two polystyrene blocks, separated by a block of saturated conjugated diene, preferably a saturated polybutadiene block. The preferred styrenic block copolymers have a linear structure, although in some embodiments, branched or radial polymers or functionalized block copolymers make useful compounds. The total number average molecular weight of the styrenic block copolymer is preferably from 30,000 to 250,000 if the copolymer has a linear structure. Such block copolymers typically have an average polystyrene content from 6 to 65, more typically from 10 to 40 wt % of the copolymer.

The styrenic block copolymers may be produced by any well known ionic block polymerization or copolymerization procedures including the well known sequential addition of monomer techniques, incremental addition of monomer techniques or coupling techniques as illustrated in, for example, U.S. Pat. Nos. 3,251,905, 3,390,207, 3,598,887, and 4,219,627, all of which are incorporated herein by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905, 3,265,765, 3,639,521, and 4,208,356, the disclosures of which are incorporated herein by reference. Examples of styrenic block copolymers suitable for the invention are described in EP0712892, WO 2004/041538, U.S. Pat. Nos. 6,582,829, 4,789,699, 5,093,422 and 5,332,613, and US 2004/0087235, 2004/0122408, 2004/0122409, and 2006/0211819. Nonlimiting examples of suitable styrenic block copolymers include styrene/butadiene (SB) copolymers, styrene/ethylene/butadiene/styrene (SEBS) terpolymers, styrene/butadiene/styrene (SBS) terpolymers, hydrogenated SBS or SEBS, styrene/isoprene (SI), and styrene/ethylene/propylene/styrene (SEPS) terpolymers. Commercial sources of styrenic block copolymers include Kraton Polymers (SEBS G1643M, G1651ES), Asahi Kasei Chemicals Corporation, and Kuraray America.

Alternative polymers that can be included in the TPE component include, but are not limited to, polybutadiene, poly(styrene-butadiene), poly(acrylonitrile diene) rubbers and saturated rubber, the diene rubber obtained by hydrogenating butadiene, isoprene rubber, chloroprene rubber, polybutalacrylate rubber, and ethylene/α-olefin copolymer rubber, where the α-olefin is an α-olefin having 3 to 20 carbon atoms, such as propylene, 1-butene, 1-pentene, 1-hexene, 4-methyl-1-pentene, 1-heptene, 1-octene, 1-nonene, 1-decene, 1-dodecene, and the like.

Carbon Fiber Component

The composition includes from 5 wt % to 60 wt % (e.g., from 5 wt % to 40 wt %, from 5 wt % to 30 wt %, from 10 wt % to 30 wt %, and/or from 15 wt % to 25 wt %) of a carbon fiber component. In exemplary embodiments, the carbon fiber component comprises chopped carbon fibers derived from recycled waste. The chopped carbon fibers may be produced by any process or means known to one of ordinary skill in the art. In a non-limiting, exemplary embodiment, the chopped carbon fibers are manufactured from a polyacrylonitrile (PAN) precursor via oxidation at around 200-300° C., carbonization at around 1200-1400 ° C., surface treatment, sizing, winding as a continuous carbon fiber tow, and cutting into chopped carbon fibers. In further exemplary embodiments, the chopped carbon fibers are produced by creating a weave from continuous carbon fiber and using the weave in a molding process followed by cutting the edge trim and using that as a source of chopped fiber.

In certain embodiments, the chopped carbon fibers have a fiber length of 6 mm to 12 mm prior to any processing (e.g., molding). In certain embodiments, the carbon fiber component is comprised of short carbon fibers and long carbon fibers. In certain embodiments, the chopped carbon fibers have a filament diameter of between 5 microns and 15 microns. In certain embodiments, the chopped carbon fibers have a density from 0.170 g/cc to 0.185 g/cc (e.g., from 0.175 g/cc to 0.181 g/cc) in accordance with ISO 10119. In certain embodiments, the chopped carbon fibers have a tensile strength from 1000 MPa to 6000 MPa (e.g., from 3500 MPa to 5500 MPa, from 4000 MPa to 5000 MPa and/or from 4000 MPa to 4500 MPa) in accordance with ISO 10618. In certain embodiments, the chopped carbon fibers have a tensile modulus from 100 GPa to 500 GPa (e.g., 200 GPa to 300 GPa, from 210 GPa to 280 GPa and/or from 220 GPa to 250 GPa) in accordance with ISO 10618. In certain embodiments, the chopped carbon fibers have an elongation at break from 1% to 3% (e.g., from 1.5% to 2.1%, from 1.6% to 2% and/or from 1.7% to 1.9%) in accordance with ISO 10618. In certain embodiments, the chopped carbon fibers have a bulk density from 300 g/l to 600 g/l in accordance with ISO 10119.

The chopped carbon fibers may be coated with various sizings. Exemplary sizings for the chopped carbon fibers of the present disclosure include polyurethane-based emulsions, epoxy-based emulsions, phenoxy-based emulsions, epoxy- and phenoxy-based emulsions, aromatic polymer based emulsions, glycerin-based emulsions, hydrocarbon-based emulsions, polyamide-based emulsions, and/or combinations thereof. In certain embodiments, the chopped carbon fibers have a sizing content from 0.5 wt % to 10 wt % (e.g., from 1 wt % to 5 wt %).

In certain embodiments, the carbon fiber component comprises chopped carbon fibers commercially available from, for example, SGL Group (e.g., SIGRAFIL® carbon fibers), DowAksa, Toray (e.g., TORAYCA™ carbon fibers), etc.

Composition

The compositions of the present disclosure may further include a homopolymer polypropylene, a random copolymer polypropylene, an ethylene/C4-8 alpha-olefin plastomer, and/or a polystyrene-block-poly(ethylene-co-butylene)-block-polystyrene (SEBS) triblock thermoplastic elastomer.

The compositions of the present disclosure may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, one of which is dry blending of pellets of the compositions with pellets of another polymer.

The compositions of the present disclosure can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, metal fibers, boron fibers, ceramic fibers, polymeric fibers, kaolin, glass, ceramic, carbon/polymeric microspheres, silica, mica, carbon fibers, clay, hemp fibers, natural fibers, carbon black, and combinations thereof.

The compositions of the present disclosure can optionally be modified by, for example, grafting, hydrogenation, nitrene insertion reactions, or other functionalization reactions using compatibilization agents such as those known to those skilled in the art. Exemplary compatibilization agents include, but are not limited to maleic anhydride grafted polyolefins.

In certain embodiments, the composition of the present disclosure comprises a flexural modulus (ISO 178) from 1000 MPa to 6000 MPa (e.g., from 1500 MPa to 5500 MPa, from 2000 MPa to 5000 MPa, from 2500 MPa to 4500 MPa, from 3000 MPa to 4000 MPa, etc.). In certain embodiments, the composition of the present disclosure comprises a flexural modulus (ISO 178) of greater than 3000 MPa (e.g., greater than 3500 MPa and/or greater than 3600 MPa).

In certain embodiments, the composition of the present disclosure comprises a Charpy impact strength (ISO 179-1) from 5 kJ/m$^2$ to 35 kJ/m$^2$ (e.g., from 10 kJ/m$^2$ to 30 kJ/m$^2$, from 15 kJ/m$^2$ to 25 kJ/m$^2$, or from 17 kJ/m$^2$ to 20 kJ/m$^2$). In certain embodiments, the composition of the present disclosure comprises a Charpy impact strength (ISO 179-1) of greater than 10 kJ/m$^2$ (e.g., greater than 15 kJ/m$^2$, greater than 16 kJ/m$^2$, greater than 17 kJ/m$^2$, greater than 18 kJ/m$^2$, or greater than 19 kJ/m$^2$).

In certain embodiments, the composition of the present disclosure comprises a yield stress (ISO 178) from 10 MPa to 50 MPa (e.g., from 10 MPa to 40 MPa, from 10 MPa to 35 MPa, from 15 MPa to 30 MPa, from 20 MPa to 30 MPa, from 20 MPa to 25 MPa, etc.).

In certain embodiments, the composition of the present disclosure comprises a yield strain (ISO 178) from 1% to 15% (e.g., from 1% to 10%, from 2% to 8%, from 2% to 5%, etc.).

In certain embodiments, the composition of the present disclosure comprises a stress at break (ISO 178) from 1 MPa to 20 MPa (e.g., from 1 MPa to 15 MPa, from 3 MPa to 10 MPa, from 4 MPa to 10 MPa, from 4 MPa to 8 MPa, etc.).

In certain embodiments, the composition of the present disclosure comprises a strain at break (ISO 178) from 10 MPa to 70 MPa (e.g., from 15 MPa to 65 MPa, from 20 MPa to 60 MPa, from 20 MPa to 55 MPa, from 20 MPa to 50 MPa, etc.).

Compositions of the present disclosure may have one, some, or all of the above-described properties regarding flexural modulus, Charpy impact strength, yield stress, yield strain, stress at break, and strain at break.

EXAMPLES

Density is measured in accordance with ASTM D792 or ISO 1183. The results are reported in grams (g) per cubic centimeter, or g/cc.

Melt flow index is measured in accordance with ASTM D1238 or ISO 1133 at 190° C., 2.16 kg. The results are reported in grams/10 minutes.

Melt flow rate is measured in accordance with ASTM D1238 or ISO 1133 at 230° C., 2.16 kg. The results are reported in grams/10 minutes.

Charpy Impact Test: Impact performance is measured using a Pendulum Impact Tester Zwick 5102. Samples are first cut into appropriate samples, notched, and cooled for 24 hours (for temperatures lower than 23° C.). The tests are performed according to ISO 179-1 standard.

Flexural Modulus: Flexural modulus is determined using a Zwick Z010 and performed according to ISO 178 standard.

Tensile Properties: Tensile properties, including yield stress, yield strain, stress at break, and strain at break are measured in accordance with ISO 178.

Melt temperature, or "Tm" as used herein (also referred to as a melting peak in reference to the shape of the plotted DSC curve), is typically measured by the DSC (Differential Scanning calorimetry) technique for measuring the melting points or peaks of polyolefins as described in U.S. Pat. No. 5,783,638, wherein the Tm is the second heat melt temperature taken at a ramp rate of 10° C./min and Tm is largest peak. The heat of fusion (Hf) (measured in Joules/gram, J/g) and the peak melting temperature are reported from the second heat curve. Peak crystallization temperature is determined from the cooling curve. Crystallization temperature, Tc, is determined from the DSC cooling curve as above except the tangent line is drawn on the high temperature side of the crystallization peak. Where this tangent intersects the baseline is the extrapolated onset of crystallization (Tc). It should be noted that many blends comprising two or more polyolefins will have more than one melting point or peak, and many individual polyolefins will comprise only one melting point or peak.

The following materials are principally used in the examples of the present disclosure:

PP: A polypropylene homopolymer having properties including a density of 0.900 g/cc (ISO 1183), a melt flow rate of 50.0 g/10 minutes (ISO 1133 at 230° C., 2.16 kg), and a flexural modulus of 1800 MPa (ISO 178) (available as H734-52RNA Polypropylene from Braskem).

TPE: A propylene-ethylene copolymer having properties including a density of 0.888 g/cc (ASTM D792), a melt flow rate of 2 g/10 minutes (ASTM D1238 at 190° C., 2.16 kg), and a flexural modulus of 57 KPsi (ASTM D790) (available as VERSIFY™ 2000 from The Dow Chemical Company).

AC1101: Chopped carbon fibers (length of 6 mm) sized with an epoxy- and phenoxy-based emulsion with properties including a density of 1.76 g/cc (ISO 10119) and a tensile modulus of 240 GPa (ISO 10618) (available as AC1101 from DowAska).

Based on these materials, formulations are prepared for the inventive and comparative examples of the present disclosure as seen in Table 1. All formulations in Table 1 are compounded on a Buss Compounder MDK/E 46 with a single mixing screw (46 mm L/D). The compounds are then injection molded as dog bones using an Injection Molding Boy 55E (BOY Machines, Inc.) for mechanical property testing. The mechanical property test results are also provided in Table 1.

TABLE 1

| Materials | | Ex. A | Ex. B | Ex. C | Ex. 1 |
|---|---|---|---|---|---|
| Formulation (wt %) | | | | | |
| AC1101 | | — | — | 20 | 20 |
| PP | | 100 | — | 80 | — |
| TPE | | — | 100 | — | 80 |
| Mechanical Properties at 23° C. | | | | | |
| Flexural Modulus | MPa | 1940 ± 20 | 421.31 ± 6.61 | 6063 ± 56 | 3608 ± 30 |
| Charpy Impact Strength | kJ/m2 | 2.18 ± 0.08 | 37.30 ± 2.17 | 2.86 ± 0.11 | 18.93 ± 0.95 |
| Yield Stress | MPa | 38.51 ± 0.44 | 14.98 ± 0.07 | 36.74 ± 0.13 | 20.77 ± 0.46 |
| Yield Strain | % | 6.96 ± 0.17 | 13.02 ± 0.18 | 2.88 ± 0.10 | 3.79 ± 0.27 |
| Stress at break | MPa | 33.63 ± 2.38 | 21.53 ± 0.30 | 34.28 ± 0.28 | 5.08 ± 1.07 |
| Strain at break | MPa | 12 ± 3 | 438 ± 12 | 4 ± 0 | 35 ± 12 |

As seen when comparing Inventive Example 1 with Comparative Examples A-C, Inventive Example 1 surprisingly and unexpectedly shows that the combination of carbon fibers with a thermoplastic polyolefin elastomer results in compositions having a reasonably high stiffness while maintaining a high Charpy impact strength. Inventive Example 1 also surprisingly shows that certain tensile properties are not compromised as opposed to the comparative examples. These results are surprising and unexpected, since one of ordinary skill in the art would assume that the addition of carbon fibers to a composition would negatively impact the stiffness and toughness of the composition due to the fact that carbon fibers are very brittle and break down to small fibers after being compounded or injection molded into parts.

Furthermore, use of a propylene/alpha-olefin copolymer is expected to decrease gloss appearance and improve the resistance to abrasion.

It is specifically intended that the present disclosure not be limited to the embodiments and illustrations contained herein, but include modified forms of those embodiments including portions of the embodiments and combinations of elements of different embodiments as within the scope of the following claims.

The invention claimed is:

1. A composition comprising:
(A) from 40 wt % to 95 wt % of a thermoplastic polyolefin elastomer, wherein the thermoplastic polyolefin is a propylene-ethylene random copolymer; and
(B) from 5 wt % to 60 wt % of a carbon fiber component, wherein the carbon fiber component comprises chopped carbon fibers sized with an epoxy- and phenoxy-based emulsion, and wherein the thermoplastic polyolefin elastomer is a propylene-ethylene random copolymer having a density from 0.870 g/cc to 0.900 g/cc as measured by ASTM D792 and a melt flow rate from 0.1 g/10 minutes to 50 g/10 minutes as measured by ASTM D1238 at 190° C/2.16 kg, and the propylene-ethylene random copolymer comprises between 1-20 weight percent units derived from ethylene.

2. The composition of claim 1, wherein the composition has a flexural modulus of greater than 3000 MPa.

3. The composition of claim 1, wherein the composition has a Charpy impact strength of greater than 10 kJ/m$^2$.

* * * * *